United States Patent Office 3,526,604
Patented Sept. 1, 1970

3,526,604
POLYMERIZATION OF UNSATURATED MONO-
MERS WITH CATALYSTS FORMED FROM THE
REACTION OF METALS AND DERIVATIVES
OF GROUPS I-A AND II-A WITH COMPOUNDS
OF GROUP III-A
Francis T. Wadsworth, Lake Charles, La., assignor to
Cities Service Company, a corporation of Delaware
No Drawing. Filed Sept. 1, 1965, Ser. No. 484,451
Int. Cl. B01j 11/82
U.S. Cl. 260—2                                          10 Claims

ABSTRACT OF THE DISCLOSURE

This disclosure is concerned with an improved method of preparing catalysts from the interaction of metals and derivatives of Groups I-A and II-A with compounds of Group III-A for the anionic polymerization of polymerizable unsaturated monomers.

---

This invention is a method of preparing catalysts for the anionic or carbanionic catalysis or initiation of the polymerization of polymerizable monomers, particularly compounds containing carbon-to-carbon unsaturation. This application is related to the copending application of John J. Hawkins, Ser. No. 484,430, filed Sept. 1, 1965.

As taught by said copending application, such polymerizations are improved by the conjoint utilization of a compound of an element of Group III-A of the periodic chart of the elements, together with a conventional anionic catalyst of the Group I-A and Group II-A metals which exist as stable isotopes, and alloys and certain compounds thereof. Thus, that application teaches that a dispersion of sodium or other alkali metals in conjunction with controlled quantities of compounds such as triethylaluminum and triisobutylaluminum polymerize vinyl monomers and other monomers. The catalyst system sodium-triethylaluminum was found to be particularly effective for polymerizing a mixture of butadiene, vinyltoluene, and isobutylene. The technique employed prior to the present invention was to mix catalyst, solvent and monomers in a pressure reactor and to slowly increase the temperature to 50–80° C. The reaction commences after an induction period of from about 40 minutes to about 1.5 hours, after reaching the specified temperature, using that method.

The present invention provides a method for improving polymer quantity and quality as well as rendering the polymerization process more amenable to control. Another advantage is in faster and better distribution of catalyst, so that local "starvation" for catalyst and consequent non-uniformity of product is avoided. Furthermore, better control of polymer molecular weight and the proportion of stereo-regular polymers is possible in some cases.

The general method of operation of this invention is to charge sodium, other alkali metal, alkaline earth metal or compounds thereof, to an autoclave along with a small quantity of trialkylaluminum or other cocatalyst described herein, and preferably with a suitable solvent such as a liquid alkane. The catalyst system is then activated, with or without the application of heat, prior to charging the monomers or combining the catalyst or initiator system therewith. While room temperature is suitable, a preferred procedure is to bring the catalyst system up to the polymerization temperature, for a period of time prior to combining the catalyst system with the monomer, until activation of the catalyst takes place.

It has been found that by pre-activating the catalyst components, certain advantages accrue which give an even further improvement in polymerization procedures and polymer using the catalyst of said Hawkins application. Thus, the polymerization is usually complete within one and one-half to two hours, compared with a longer period of time where the catalyst components and monomers are introduced into the reactor in succession or simultaneously without pre-activating the catalyst components. The precise nature of the change that takes place in the caalyst is not known and the change is suitably described by referring to the change as "activation" of the catalyst.

As was pointed out in said Hawkins application, in anionic polymerization processes, many problems and limitations have been encountered, and a variety of solutions has been proposed by prior workers. One important and well recognized problem is that of impurities in the monomer being polymerized or solvents used therewith. The difficulties engendered thereby include inactivation of the catalyst, which may require a larger proportion of catalyst, a slowing of the reaction, and where the object is to direct or control the manner in which the monomer molecules combine, that is, to form stereoregular polymers, the impurities commonly interfere.

One example of a monomer and the impurities therein will give an indication of problems which may be encountered with this and other monomers. Butadiene-1,3 is commonly prepared by dehydrogenation of butene, followed by the formation of a crystalline complex of butadiene with cuprous ammonium acetate, separation of the complex from other materials, and heating of the complex to decompose the same and release butadiene. By this method it has been found that butadiene of a purity between about 95% and 99% is readily obtained. The impurities present in such butadiene include in most cases small amounts of isobutane and n-butane, isobutylene, trans-butene-2, cisbutene-2, propylene, propadiene, butadiene-1,2; methylacetylene, ethylacetylene, dimethylacetylene, and vinylacetylene. Hereinafter, such butadiene having small amounts of such impurities is referred to as "plant" butadiene. In addition, carbonyl compounds and water are present, and normally the butadiene contains polymerization inhibitors such as tertiary butylcatechol. This monomer and solvents used therewith also commonly contain impurities such as alcohols, amines, water, nitrogen-containing compounds, oxygen, peroxides and sulfur-containing compounds. These may also interfere with the desired course of a given polymerization reaction.

In some instances the compound of the Group III-A element reacts with or forms a complex compound with a portion of these conventional anionic catalysts, so that the cocatalyst contains an anionic catalyst as a compound or complex of the two. In cases where impurities are present which react with a portion of one or both catalyst components, these products of such reactions are also present.

Wherever a particular group of elements is referred to herein, the periodic chart intended is that of H. G. Deming, appearing in Lange's Handbook of Chemistry, 7th ed., pp. 58–59 (1949), Handbook Publishers Incorporated, Sandusky, Ohio.

While any of the known anionic polymerization catalysts are contemplated as being within the invention, a particularly preferred group of catalysts are the Group I-A and II-A metals existing as stable isotopes, and certain compounds thereof. Thus, the metals lithium, sodium, potassium, rubidium, cesium, beryllium, magnesium, calcium, strontium, and barium, as well as alloys thereof, and certain compounds thereof, are the preferred anionic catalysts according to the invention.

As has been suggested, in addition to individual metallic anionic polymerization catalysts and compounds thereof, alloys thereof are useful. For example, an alloy of lithium with up to about 10 percent sodium or potassium by weight is suitable. Another example is an alloy of up to about 50 percent calcium together with sodium or lithium. It is preferred that the metallic catalyst be finely divided, e.g., .1–50μ and suspended in liquid. Of course coarser particles such as 200μ may be used. Another way of using such catalysts is to deposit them on a support such as aluminum or calcium carbonate particles.

Particular derivatives of these metals have the formula M(R)$_x$ wherein R is an organic radical, preferably a hydrocarbyl radical, and/or a hydrogen radical, M is selected from said Group I–A and II–A metals, and $x$ is the valence of M. The given formula for the Group I–A and II–A metal derivatives includes M$_w$R′, $w$ being 1 for divalent metals and 2 for monovalent metals, and R′ being an organic radical, preferably a hydrocarbyl radical, where two valences of a metal M are occupied by a single radical R, e.g., Na$_2$R, MgR. Grignards, RMX, M being a divalent metal and X being halogen, are also useful. While the radical R is desirably hydrocarbyl or hydrogen, and R′ is desirably a hydrocarbyl radical, in its broader aspects the invention includes as the radical R or R′ any organo radical having the grouping

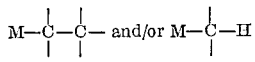

In other words where the term "organometallic" is used herein, the term designates compounds in which the metal is bonded by a covalent bond to an organic carbon atom, that is, a carbon atom bonded to hydrogen and/or another carbon atom. The radical R or R′ is preferably a hydrocarbyl radical selected from the group consisting of alkyl, aryl, aralkyl, alkaryl, and cycloalkyl, and having less than about twenty carbon atoms. Immediately below, where "radicals" are mentioned, the radical R or R′ is intended.

Suitable alkyl radicals include methyl, ethyl, propyl, isobutyl, n-isobutyl, ethyl, butyl, amyl, isoamyl, hexyl, heptyl, octyl, nonyl, decyl, dodecyl, pentadecyl, octadecyl, ethylene, hexamethylene, and in general any straight or branched chain alkyl or alkylene radical having less than about 20 carbon atoms, and more preferably, an alkyl radical having between 2 and about 6 carbon atoms, inclusive.

Suitable aryl radicals include phenyl, biphenyl, α-naphthyl, β-naphthyl, α-anthryl, and β-anthryl. Included among the suitable alkaryl radicals are tolyl, xylyl, 2-mesityl and duryl. Aralkyl radicals included in the invention are benzyl, phenethyl, m-methylphenyl, benzocyclohexyl, and β-naphthylmethyl. Cycloalkyl radicals are also useful and include cyclopentyl, cyclohexyl, cyclooctyl, 3-methylcyclohexyl, and 3-nitrocyclohexyl. Suitable alkenyl radicals include vinyl and allyl. Preferably the aryl and other radicals have less than about 25 carbon atoms.

Organometallic compounds of the Group I–A metals useful according to the present invention include: phenyllithium; normal butyllithium; isobutyllithium; p-methoxyphenyllithium; benzyllithium; triphenylmethyllithium; cyclohexyllithium; tolyllithium; α-naphthyllithium; n-amyllithium; hexamethylenedilithium; triphenylmethylpotassium; diphenylcyclohexylmethyl potassium; diphenylmethyl potassium; sodium naphthalene (C$_{10}$H$_8$Na$_2$); sodium+sodium isopropoxide; amyl sodium+NaCl+ sodium isopropoxide; sodium+sodium dodecoxide; methylsodium; phenylsodium; n-amylsodium; ethylsodium; benzylsodium; tetraphenylenedisodium; phenylisopropylpotassium; ethylrubidium; and ethylcesium.

Examples of organometallic compounds of the Group II–A metals useful according to the invention are as follows: dimethylberyllium; diethylberyllium; di-n-butylberyllium; ethylberyllium bromide; n-butylberyllium iodide; phenylberyllium iodide; dimethylmagnesium; diphenylmagnesium; phenylmagnesium bromide; ethylmagnesium iodide; diethylcalcium; diphenylcalcium; methylphenylcalcium; phenylcalcium iodide; diethylbarium; and diphenylstrontium.

The Group III–A organometallic compounds, the second component of the catalyst system used in the process of the present invention, are referred to herein as "cocatalysts" and include a number of useful compounds. As indicated above the phrase "organometallic," is intended to designate compounds in which an organic carbon is bonded to the metal atom. Organometallic halides, organometallic hydrides, and "organic" radicals bonded to a metal are given the same limitation. In this specification and in the claims, the term "metal" includes boron. The Group III–A compounds useful in the present invention have the empirical formula M′R″$_{(y-z)}$X$_z$ wherein M′ is an element of Group III–A of the periodic chart, specifically, B, Al, Ga, In, and Tl, R″ is an organic radical, preferably a hydrocarbyl radical, both as defined above, X is a halide radical or the hydrogen radical, $y$ is the valence of the metal M′, $z$ is from 0 to a value equal to $y$, and when X is a halide radical, $z$ is 1 to 2. Useful Group III–A compounds according to the present invention include: B$_2$H$_6$, diborane(6); B$_5$H$_{11}$, pentaborane(11); CH$_3$BH$_4$, methyltetrahydroborane; NaBH$_4$ (B$_2$H$_6$+Na gives this in situ); LiBH; (CH$_3$)$_3$B, trimethylborane; (C$_6$H$_5$)$_3$B, triphenylborane; (n-C$_4$H$_9$)$_3$B tri-n-butylborane; diphenylboron hydride; (diethylboronhydride)$_2$; diethylcyclopentylborane; triethyl aluminum; diethylaluminum chloride; diethylaluminum iodide; triphenylaluminum; triphenylgallium; triethylgallium; triphenylindium; trimethylindium; triphenylthallium; diethylaluminumhydride; di-n-isopropyl aluminum hydride; di-n-dodecylaluminum hydride; triisopropyl aluminum; diethylbenzylaluminum; cyclohexyldiethylaluminum; tri-n-hexylaluminum; diethylaluminum fluoride; diethylaluminum chloride; di-n-propylaluminum iodide; ethylaluminum dichloride; and others.

Other cocatalysts useful with anionic polymerization catalysts according to the invention include a complex of sodium and triarylboron, sodium aluminum tetraisobutyl, sodium aluminum hydride, lithium aluminum hydride, lithium aluminum tetraethyl, sodium boron tetrabutyl, and magnesium bis(tetraethyl aluminum), lithium aluminum tetracyclopentadienyl, and others. These additional cocatalysts may be represented by the formulae MM′H$_4$, MM′R″$_4$, M(M′R″$_4$)$_2$ and M(M′H$_4$)$_2$, M being divalent in the last two instances, where M and M′ are as above.

The general properties and basic methods of preparing the above-described types of compounds of the metals of Groups I–A, II–A and III–A, may be found for example in Encyclopedia of Chemical Technology, Kirk-Othmer, vol. 9, pp. 612–642 (1952), and in Encyclopedia of Chemical Technology, 2nd ed. Kirk-Othmer, vol. 2, pp. 26–41 (1963), and vol. 3, pp. 707–727 (1964), and in the art cited in these publications.

The catalyst-cocatalyst combination is utilized in the polymerization of the monomers specified herein in an amount of between about .1% and about 10%, preferably between about .5% and about 5%, based on the weight of the monomer or monomers. The ratio of cocatalyst, that is, the compound of the Group III–A metal (which includes boron as indicated elsewhere herein) to the Group I–A or II–A metal or compound as the anionic polymerization catalyst is within a molar ratio of less than 1 to 1, preferably between about 1 to 6 and 1 to 100.

In preparing catalysts described heretofore according to the method of the present invention, anionic catalyst and cocatalyst are mixed together, preferably with a solvent such as in inert hydrocarbon liquid, and the mixture is held a period of time until activation takes place. The temperature of the activation procedure is not particularly critical and may take place at room temperature, or preferably at a higher temperature such as the temperature at which polymerization takes place. Thus, this activation may be instituted at a temperature ranging from about 20° C. to bout 250° C. Preferred temperatures are in the range of 50° C. to 150° C. The time required for the activation varies, thus; when sodium, potassium, lithium, or alloys thereof in finely divided form, is combined with triethylaluminum according to the invention and heated to 80° C., the activation usually takes place in about 10 minutes. Where the anionic catalyst and the cocatalyst are mixed at room temperature, about 20° C., in the case of a finely divided sodium dispersion and triethylaluminum the mixture changed from a grayish-white color to a gray-black color and a small amount of heat was evolved such that the temperature raised to about 35° C. This took about 45 minutes. The time for the activation of the catalyst components is preferably between about five minutes and about one hour depending upon the temperature. Longer periods of time may be used but without material benefit.

Where a solvent is utilized in the polymerization reaction, it is desirably included with the catalyst components in the activation method of the present invention. The activation may be achieved batchwise or by continuous procedure, and take place in the reactor prior to the introduction of monomer or externally of the polymerization reactor. Where the activation takes place externally of the reactor the anionic catalyst, the cocatalyst, and the solvent my be continuously metered to a heat exchange device such as a heating coil, and fed thence to the reactor prior to, concurrently with or after the introduction of the monomer. While the monomer may be preheated, it is preferred that it be introduced gradually into the catalyst-cocatalyst-solvent mixture for convenient control of the temperature of the exothermic polymerization reaction. The following examples are illustrative of presently preferred modes of carrying out the invention.

EXAMPLE 1

A cocatalyst consisting of 4 ml. of triethylaluminum in about 20 ml. of hexane was added to 20 g. of a dispersion of sodium in hexane containing 40% of sodium by weight with stirring while gradually introducing the triethylaluminum. The color of the mixture was grayish-white which gradually changed to a gray-black. The catalyst and the cocatalyst components were at room temperature when mixed and the temperature of the mixture rose autogenously to about 35° C. The mixture was stirred overnight. When thus actviated the catalyst-cocatalyst combination in the given amount was used to catalyze the polymerization of 560 g. of butadiene, 70 g. of vinyltoluene, and 1400 g. of hexane, and the polymerization reaction was essentially complete in about two hours.

The viscosity in a No. 4 Ford Cup was 14,400 seconds, the intrinsic viscosity was .473, total unsaturation determined by the iodine-monochloride method was 1.46, and the ratio of vinyl unsaturation to trans-unsaturation was 2.0. The product when diluted with solvents such as xylene and toluene and compounded with conventional compounding ingredients for synthetic drying oils, the dilution being sufficient to provide a 1 to 2 mil coating gave an excellent can coating, when cured for 10 minutes at 400° F. in the presence of air. The substrate was tin-plated sheet steel.

EXAMPLE 2

A small quantity of solvent (hexane) was drawn by vacuum into an evacuated autoclave and was followed by 43 g. of 40% sodium dispersion (percent is by weight), and the remainder of the 1400 g. of solvent. Diethylaluminum chloride cocatalyst in the amount of 3 g. was then charged as a 10% solution in hexane. The stirrer of the autoclave was started and the monomers, consisting of 560 g. butadiene, 70 g. isobutylene, and 70 g. vinyltoluene, having been weighed into a separate bomb, were pressured into the autoclave by applying heat to the bomb, and the autoclave heaters were turned on. When the temperature reached 55° C., the reaction was continued for two hours and twenty six minutes. At the end of the reaction period, 27 g. of 50 mole percent water in methanol solution under a pressure of 100 lb./in.$^2$ was introduced into the autoclave from a small bomb. This reacted with residual sodium, evolving hydrogen. After stirring 10 min. the reaction mixture was blown out into a container. After setting overnight, the polymer solution was centrifuged. The supernatant polymer solution was decanted into round bottom flasks and the solvent was removed by vacuum evaporation at 80° C. and 10 mm. pressure. Following the same procedure but applying the present invention by heating the catalyst-cocatalyst-solvent combination to about 80° C., prior to introduction of the monomers, significantly decreases the reaction time.

EXAMPLES 3–8

The solvent (hexane, about 1400 g.), sodium or other anionic catalyst and triethylaluminum or other cocatalyst were placed in the autoclave and heated to about 80° C. The premixed monomers (about 700 g.) were charged over a period of time at such a rate that the heat of polymerization was removed by cooling water (about 30–45 minutes). Complete reaction of monomers (another 30 minutes at 80° C.) was followed by an acetic acid-methanol quench for 10 minutes, cooling, removal from the autoclave, settling of catalyst residues, centrifuging and evaporation to yield polymer. These examples also show the applicability of a variety of anionic catalysts, according to the invention of John J. Hawkins, Ser. No. 484,430, filed Sept. 1, 1965.

| | Polymer properties | | | | Polymerization details | | | |
|---|---|---|---|---|---|---|---|---|
| Example | No. seconds in No. 4 Ford Cup | η | Residual metal, p.p.m. | V/T | Alkali metal catalyst dispersion, g. | Cocatalyst Al(Et)$_3$, g. | Mon. data | Remarks |
| 3 | 61 | 0.069 | 21 | 1.5 | 20 v | 1 | f | HOAc, THF quench. |
| 4 | 418 | 0.196 | | 1.6 | 12 rs | 3 | b | |
| 5 | 220 | 0.161 | 13 | 1.6 | 12 rt | 3 | b | |
| 6 | 2,060 | 0.347 | | 1.4 | 6 rs | 3 | b | HOAc-MeOH quinch. |
| 7 | Insol. | 0.216 | <5 | 1.5 | 12 ru | 3 | b | Do. |
| 8 | 72 | 0.103 | 11 | 1.5 | 28 rt | 1 | b | HOAc (40 g.) quench. | b—75/20/5 (butadiene/vinyltoluene/isobutylene).
f—75/25/0 (butadiene/vinyltoluene/isobutylene).
r—50% dispersion, in Decalin.
s—K dispersion.
t—K-Na (50-50) dispersion.
u—Li dispersion.
v—Na, 40% dispersion, in xylene.
η—Intrinsic viscosity, dl./g.
THF—Tetrahydrofuran.
V/T—Vinyl/trans unsaturation ratio.

Preferably the polymerization is solution polymerization. Bulk polymerization, that is, polymerization in which the monomer and catalysts are substantially the sole ingredients in the reaction mixture, is also useful, as will be apparent to those skilled in the art. In solution polymerization, the solvent may serve to dissolve, or to suspend the catalyst and cocatalyst. Thus, hexane dissolves triethylaluminum, but simply suspends a finely divided sodium dispersion. Of course, a solvent should be chosen which does not inactivate the catalyst components. Preferably non-polar solvents are used. Inert hydrocarbons are well suited, and these included alkanes and cycloakanes such as petroleum nephtha, hexane, heptane, methylcyclohexane, ethylcyclohexane, cyclooctane, octane, isooctane, cyclopentane, aromatic hydrocarbons, such as benzene, toluene, xylenes, ethyl benzenes, and other known solvents. In some cases a combination of solvents is useful; for example, where a catalyst component is difficulty soluble. Other useful solvents include the monomer itself. The solvents should be carefully chosen to avoid inactiviating catalysts; for example, certain tertiary alkyl chlorides may react with triethylaluminum and thus should not be used with this cocatalyst. Similarly, triethylamine, ethers, alcohols, phenols, and other compounds known to be reactive with triethylaluminum and should not be used with this particular cocatalyst, as solvents. This is to be distinguished from the use of small amounts of reactive catalyst modifiers such as alcohols which may, for example, form alkali metal alkoxides.

The invention includes any monomer known to be polymerizable by the subject anionic catalysts. Some polymerizable monomers are, of course, not suitable for use with certain anionic catalysts as is well known; for example, acrylic acid and other acids simply form salts with sodium. According to the literature, homopolymers of isobutylene or vinyl ethers are similarly not obtained using sodium as a catalyst, for example.

Suitable classes of monomers include vinyl compounds, $\alpha$-olefins, nitroolefins, alkenyl cyanides, alkenylidene cyanides, vinyl aromatic compounds (styrenes), $\alpha,\beta$-unsaturated nitriles, fluoroalkenes, unsaturated alkyl esters of $\alpha,\beta$-unsaturated acids, aldehydes, cyclic lactams, conjugated and non-conjugated diolefinic compounds, vinylcycloalkanes, vinylcycloalkenes, acetylenes, and lactams, as homopolymers and copolymers. In general, any polymer which may be prepared by an anionic or carbanionic polymerization may be prepared according to the process of the present invention.

Specific examples of monomers and polymers useful according to the invention are: ethylene, propylene, nitroethylene, vinylidene cyanide, acrylonitrile, methacrylonitrile, styrene, tetrafluoroethylene, methacrylamide, allymethacrylate, ethylacrylate, n-butylacrylate, 1,2-dihydronaphthalene, 1,4-dihydronaphthalene, 2-cyano-3-difluoropropylene, 2-cyano-2-difluoroethylene, ethylene oxide, propylene oxide, formaldehyde, epsilon-caprolactam, isopropyl acrylate, styrene; a copolymer of 10–90% ethylene, 90–10% propylene, and 0–15% of a conjugated or non-conjugated diolefin or triolefin such as butadiene-1,3,- cyclopentadiene, 1,3-cyclooctadiene, 1,5,9-cyclododecatriene, and 1,5-cyclooctadiene; a polymer of isobutylene with 0 to 10% of a diolefinic compound such as butadiene or isoprene, and 0 to 10% of a vinyl aromatic compound such as styrene; interpolymers, block polymers and graft polymers of 50–90% of a 1,3-diolefin such as butadiene, 5–40% of a nitrile such as acrylonitrile, and 5–40% of a vinyl aromatic such as styrene; 1,3-butadiene, ethylacetylene, vinyltoluene, vinylacetate, isoprene, styrene, and a copolymer of butadiene with up to 20% of a vinyl aromatic compound such as vinyltoluene or styrene and up to 20% of an $\alpha$-olefin such as isobutylene.

Unless otherwise specified, where a general name for a monomer is given, the meaning common in the art is intended, for example where butadiene is stated to be a monomer undergoing polymerization, 1,3-butadiene is intended, and unless otherwise stated, it is ordinary plant butadiene of about 98% purity and having been passed through a column of silica gel to remove most of the moisture and polymerization inhibitors such as tertiary butylcatechol.

The polymerization conditions and methods of recovering the polymers vary to some extent, depending upon the nature of the monomers, catalysts and polymer. Recovery of polymer and separation of the catalyst is readily achieved in most instances simply by washing with water. Where the anionic polymerization catalyst is such that it reacts with water to form an alkaline solution, such alkaline solution is helpful in the separation of some cocatalysts containing certain of the elements of Group III-A of the periodic chart of the elemnets, such as aluminum. Other methods of purifying the polymer include washing with alcohols such as methanol, ethanol, or isopropanol, or with organic or inorganic acids such as acetic acid. Preferably where alcohols or acids are used, they are used in combination with water.

The pressure is not particularly critical although it is preferred that the reaction take place in the liquid phase. Thus, from about 1 to about 20 atmospheres has been found to be useful.

The temperature during polymerization is suitably between about $-20°$ C. and $250°$ C., preferably between about $50°$ C. and $150°$ C. As is well known in anionic polymerizations, choice of the temperature depends upon the polymer properties desired as well as upon the monomers and catalysts.

The time depends somewhat upon the desired molecular weight of the polymer, and polymerization is continued until a major or preponderant proportion of the monomer is incorporated in polymeric groups or chains having at least three monomer units.

The polymerization process may be a batch method or a continuous method.

The foregoing and other similar polymers of a butadiene content of over about 75%, prepared by the process of the invention, have a ratio of vinyl to trans-1,4 unsaturation of between about 1.5 and 3.5. Small amounts of cis-1,4 unsaturated are also present. As used herein these terms refer to unsaturation types, and as used in the field of stereochemistry and diolefin or butadiene polymerization, designate the mode of hydrogen and carbon atoms about a carbon-to-carbon double bond as follows:

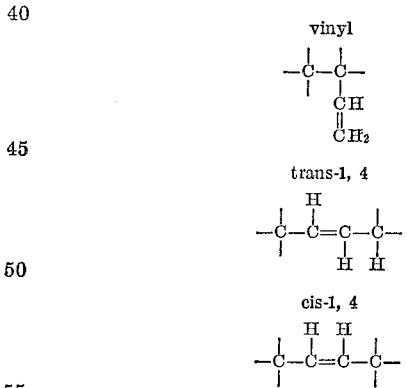

The infrared spectrometer used to analyze the polymers as to unsaturation types was a Baird-Atomic, Model 4–55.

The polymers prepared according to the invention have a variety of uses as in coating compositions, as casting resins, as elastomers, for the formation of plastic films, and various other utilities. For example, the foregoing unsaturated polymers were useful for coating metals. They were diluted with an inert solvent, to a non-volatile content of between about 30% and about 60% depending upon the intrinsic viscosity of the polymer, and then deposited as a thin film upon sheet steel having a coating of electrolytically deposited tin between the polymer and the steel or iron. The coatings were in the neighborhood of 1 to 2 mils in thickness and were cured by heating to a maximum temperature of 300 to 450° F. for a period of 10 minutes in the presence of oxygen or air. The coated metal could be sharply bent without damage to the coating, which also was highly resistant to solvents and chemicals such as acetic acid. Another use for the polymers is in printing inks when mixed with carbon black and/or other pigments and a dryer such as cobalt naphthenate together with a suitable solvent. When used in enamels, pigments such as titanium dioxide and/or zinc oxide with fillers such as clay or barites, conventional dryers such as lead naphthenate, cobalt naphthenate, manganese naphthenate, and conventional solvents and compounding ingredients are added, as is well known in the art.

Obvious variations and equivalents of procedures and materials of the invention as claimed will be apparent to those skilled in the art, and the claims are intended to include such variations and equivalents.

I claim:

1. In the anionic polymerization of a polymerizable organic monomer which includes the steps of introducing said monomer into a reaction zone together with a catalyst consisting essentially of (a) an anionic polymerization catalyst selected from the group consisting of the metals of periodic Groups I–A and II–A, and derivatives thereof having one of the formulae $M(R)_x$, $M_wR'$, and RMX wherein R is selected from the group consisting of the hydrogen radical and organic radicals, R' is a divalent organic radical capable of forming two organic carbon-to-metal bonds, M is selected from said Group I–A and II–A metals, $x$ is the valence of M, $w$ is 1 where the valence of the metal M is 2 and is 2 where the valence of the metal M is 1, and X is halogen; and (b) a compound, of a Group III–A metal of the periodic chart, which is reactive with compounds containing active hydrogen, the molar ratio of (b) to (a) being less than about 1 to 1; subjecting the materials contained in the reaction zone to polymerization conditions until a preponderant proportion of the monomer is incorporated in the polymer chains, and recovering said polymer, the improvement comprising:
   (A) combining catalyst components (a) and (b) and subjecting the mixture to a temperature between about 20° C. and 250° C. to activate said mixture, and thereafter
   (B) subjecting said monomer to the action of from about 0.1 to 10 weight percent of said catalyst under said polymerization conditions, at a temperature of from about −20° C. to 250° C.

2. The process of claim 1 in which said compound of a Group III–A metal is selected from compounds having the formulae $M'R''_{y-z}X_z$, $MM'H_4$, $MM'R''_4$, $M(M'R''_4)_2$, and $M(M'H_4)_2$ wherein M' is a metal of Group III–A of the periodic chart, R" is an organic radical having an organic carbon atom bonded to said metal, X is selected from the group consisting of the halide radicals and the hydrogen radical, $y$ is the valence of the metal M', $z$ is from 0 to a value equal to $y$, when X is a halide radical $z$ is from 1 to 2, and M is a metal selected from periodic Groups I–A and II–A.

3. The process of claim 2 in which the molar ratio of (b) to (a) is between about 1:6 and 1:100.

4. The process of claim 3 in which all of the organic radicals are hydrocarbyl radicals.

5. The process of claim 3 in which a hydrocarbon solvent is present in said step (A).

6. The process of claim 4 in which said Group III–A metal is boron.

7. The process of claim 4 in which said Group III–A metal is aluminum.

8. In a method of preparing a ctalyst useful in the anionic polymerization of a polymerizable organic monomer, wherein the monomer is polymerized in the presence of from about 0.1 to 10 weight percent of catalyst, at a polymerization temperature of from about −20° C. to 250° C., the improvement which comprises the steps of mixing
   (a) an anionic polymerization catalyst selected from the group consisting of the metals of periodic Groups I–A and II–A, and derivatives thereof having one of the formulae $MR_x$, $M_wR'$, and RMX, wherein R is selected from the group consisting of hydrogen and organic radicals having an organic carbon bond available to M, R' is a divalent organic radical having two organic bonds available to M, M is selected from said Group I–A and II–A metals, $x$ is the valence of M, W is 1 where the valence of the metal M is 2, and is 2 where the valence of metal M is 1, and X is a halogen; and
   (b) less than about one mole per mole of (a) of a compound of a Group III–A metal selected from the group consisting of compounds having the formulae, $M'R''_{(y-z)}X_z$, $MM'R''_4$, $M(M'R''_4)_2$, and $M(M'H_4)_2$, wherein M has the foregoing meaning, M' is a metal of Group III–A of the periodic chart, R" is an organic radical having an organic carbon atom bonded to said metal, X is selected from the group consisting of halogen and hydrogen, $y$ is the valence of the metal M', $z$ is from 0 to a value equal to $y$, and when X is a halide radical, $z$ is from 1 to 2,
and subjecting the mixture of (a) and (b) to a temperature between 20° C. and 250° C. for at least about five minutes in the absence of said monomer.

9. The method of claim 8 in which the mixture of (a) and (b) is subjected to said temperature while in the presence of an inert solvent, said Group III–A metal is aluminum, and said anionic catalyst in metallic sodium.

10. The method of claim 9 in which said Group III–A compound is a trialkyl aluminum.

References Cited

UNITED STATES PATENTS 3,278,508  10/1966  Kahle _____ 260—94.3

JOSEPH L. SCHOFER, Primary Examiner

R. S. BENJAMIN, Assistant Examiner

U.S. Cl. X.R.

252—429, 431; 260—93.7, 80, 88.7, 91.5, 89.3, 67, 67.5, 94.2, 94.1, 94.9, 80.78, 85.3, 879, 881